United States Patent
Vaca Torres et al.

(10) Patent No.: US 12,007,558 B2
(45) Date of Patent: Jun. 11, 2024

(54) CLEANING UNIT FOR A SENSOR

(71) Applicant: Endress+Hauser Conducta GmbH+Co. KG, Gerlingen (DE)

(72) Inventors: Alejandro Vaca Torres, Steinheim (DE); Andreas Müller, Ostfildern (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 310 days.

(21) Appl. No.: 17/659,939

(22) Filed: Apr. 20, 2022

(65) Prior Publication Data
US 2022/0342208 A1 Oct. 27, 2022

(30) Foreign Application Priority Data
Apr. 21, 2021 (DE) ...................... 10 2021 110 147.6

(51) Int. Cl.
G02B 27/00 (2006.01)
B08B 1/16 (2024.01)
B08B 1/30 (2024.01)

(52) U.S. Cl.
CPC .......... *G02B 27/0006* (2013.01); *B08B 1/165* (2024.01); *B08B 1/30* (2024.01)

(58) Field of Classification Search
CPC ....... G02B 27/0006; B08B 1/165; B08B 1/30; B08B 1/143; B08B 1/32; G01N 33/00; G01N 21/15; G01N 2021/152
See application file for complete search history.

(56) References Cited

FOREIGN PATENT DOCUMENTS

| CN | 102121900 A | * | 7/2011 |
| EP | 0590487 A1 | | 4/1994 |
| EP | 1816462 A1 | | 8/2007 |
| KR | 20090100053 | * | 9/2009 |

* cited by examiner

*Primary Examiner* — David Redding
(74) *Attorney, Agent, or Firm* — Mark A. Logan; Endress+Hauser (USA) Holding, Inc.

(57) ABSTRACT

A cleaning unit for a sensor with a sensor housing and a drive shaft comprises a holding element which extends along an axis and is suitable for being mounted on the drive shaft so that the cleaning unit can be moved by the drive shaft and a wiper element which is fastened to the holding element and has a ring which axially surrounds the holding element, so that the ring is in contact with the sensor housing of the sensor when the holding element is mounted on the drive shaft, wherein the ring has at least one tooth which extends radially to the axis.

10 Claims, 4 Drawing Sheets

CLEANING UNIT FOR A SENSOR

CROSS-REFERENCE TO RELATED APPLICATION

The present application is related to and claims the priority benefit of German Patent Application No. 10 2021 110 147.6, filed on Apr. 21, 2021, the entire contents of which are incorporated herein by reference.

TECHNICAL FIELD

The present disclosure relates to a cleaning unit for a sensor and to a sensor with the cleaning unit.

BACKGROUND

In analytical measurement technology, especially in the fields of water management and environmental analysis and in industry, e.g., in food technology, biotechnology, and pharmaceuticals, as well as for various laboratory applications, measurands, which give insights into the composition or the state of a measurement medium that is to be monitored, are vitally important. These measurands can be captured and/or monitored by means of various sensors, such as optical or acoustic sensors.

Sensors are arranged in a sensor housing in order to protect the sensor electronics from environmental influences—for example, from the measuring medium. Over time, however, it may happen that the sensor housing becomes soiled due to the environmental influences. For this reason, the sensor housing, in particular the window of the sensor housing used for detecting the sensor, must be cleaned regularly so that the sensor always provides optimal measurement results. In most cases, if the sensor housing is cleaned incorrectly, e.g., because the cleaning unit is defective, this has a direct effect on the quality of the sensor's measurement results. For example, dirt deposits on the sensor housing can cause greater rotational resistance of the cleaning unit and trigger a defect of the cleaning unit. For this reason, it is important to provide a reliable cleaning unit for a sensor.

SUMMARY

It is, therefore, an aim of the present disclosure to propose a cleaning unit for a sensor which is robust, reliable, and cost-effective.

This aim is achieved according to the present disclosure by the cleaning unit for a sensor having a sensor housing and a drive shaft.

The cleaning unit according to the present disclosure comprises:
- a holding element which extends along an axis and is suitable for being mounted on the drive shaft so that the cleaning unit can be moved by the drive shaft,
- a wiper element which is fastened to the holding element and has a ring which axially surrounds the holding element, so that the ring is in contact with the sensor housing of the sensor when the holding element is mounted on the drive shaft,
- wherein the ring has at least one tooth which extends radially to the axis.

The cleaning unit according to the present disclosure makes it possible for dirt deposits to be avoided in the region of the axis of rotation of the cleaning unit, i.e., about the drive shaft. Thus, it is avoided that the motor connected to the drive shaft in the interior of the sensor body be subjected to an unnecessarily high torque, which ultimately leads to a longer service life of the motor and to more efficient cleaning of the sensor housing.

According to one embodiment of the present disclosure, the wiper element also has a lip which extends radially to the axis and is designed to be in contact with the sensor housing when the holding element is mounted on the drive shaft.

According to one embodiment of the present disclosure, the ring and the lip are formed in one piece.

According to one embodiment of the present disclosure, the wiper element is made from rubber.

According to one embodiment of the present disclosure, the holding element and the wiper element are produced by means of a multicomponent, injection-molding process.

According to one embodiment of the present disclosure, the lip is suitable for cleaning a predetermined region of the sensor housing when the cleaning unit is moved by the drive shaft at an angle about the axis, wherein the number of teeth is selected in such a way that the teeth are arranged on the ring such that, when the cleaning unit is rotated about the angle, the teeth pass through a full angle so that deposits between the teeth are avoided.

According to one embodiment of the present disclosure, the tooth has a cleaning surface and the lip has a cleaning surface. The two cleaning surfaces are arranged in one plane.

According to one embodiment of the present disclosure, the holding element is detachably attached to the drive shaft—for example, by means of a screw.

According to one embodiment of the present disclosure, the sensor has a sensor housing and a drive shaft, and the cleaning unit is attached to the drive shaft.

According to one embodiment of the present disclosure, between the cleaning unit and the sensor housing, a sliding element is arranged on the drive shaft.

BRIEF DESCRIPTION OF THE DRAWINGS

The present disclosure is explained in more detail on the basis of the following description of the figures. The following are shown.

DETAILED DESCRIPTION

Figure 1:
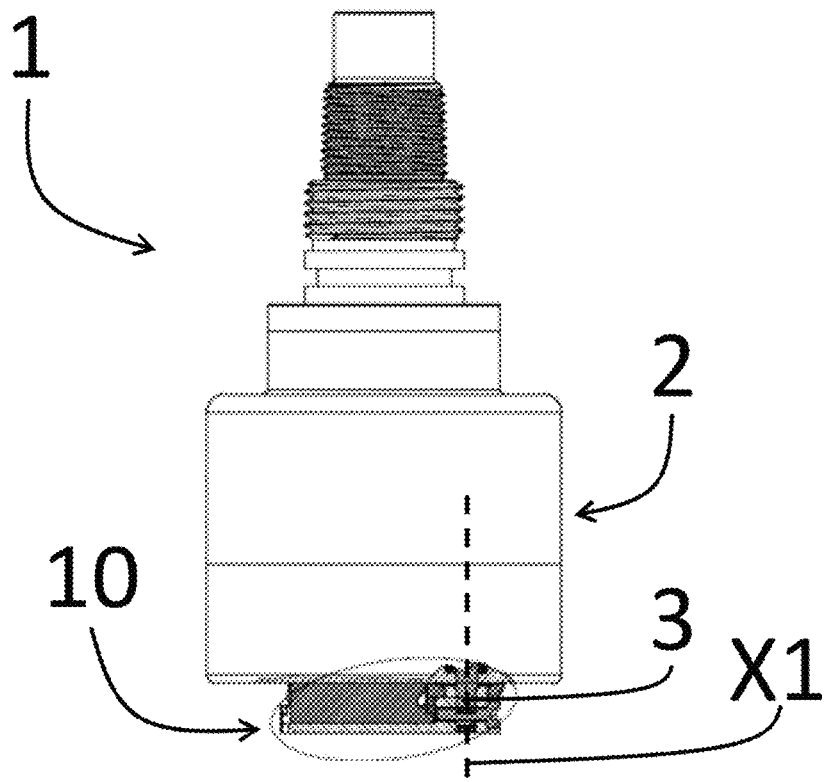
FIG. 1 shows an exemplary representation of a sensor with the cleaning unit according to the present disclosure.

FIG. 1 shows a sensor 1 with the cleaning unit 10 according to the present disclosure. The sensor 1 has a sensor housing 2 and a drive shaft 3. A motor for driving the drive shaft 3 (not shown) is arranged in the sensor housing 2. The motor is, for example, an electric motor and is frictionally connected to the drive shaft 3. The rotor of the electric motor can also serve as the drive shaft 3, for example. The drive shaft 3 extends along an axis X1 out of the sensor housing 2, so that the cleaning unit 10 can be attached to the drive shaft 3.

Figure 2:
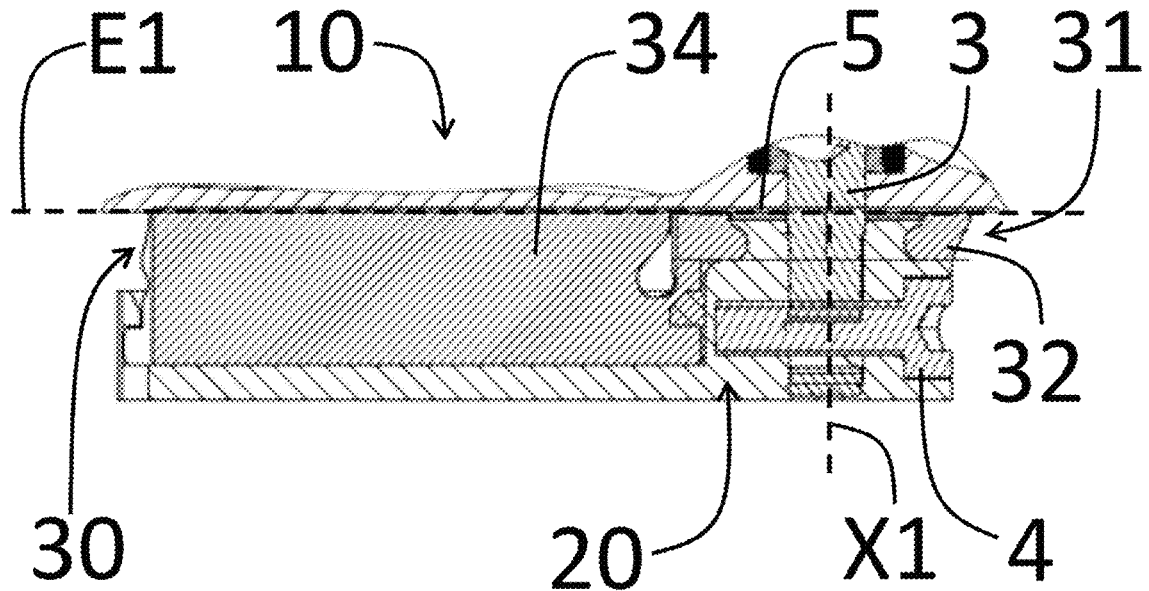
FIG. 2 shows an enlarged sectional drawing of the cleaning unit shown in FIG. 1.

FIG. 2 shows an alternative embodiment of the cleaning unit 10. The cleaning unit 10 comprises a holding element 20 and a wiper element 30.

Figure 3:
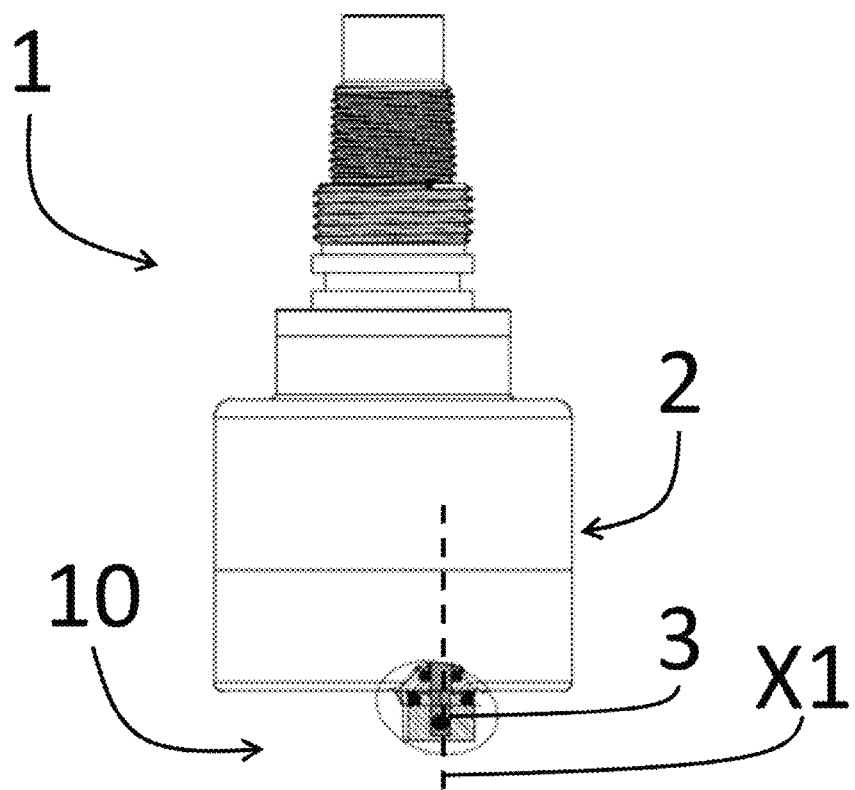
FIG. 3 shows the sensor with the cleaning unit from FIG. 1 from a different perspective.

The holding element 20 extends along the axis X1 and is suitable for being mounted on the drive shaft 3 so that the cleaning unit 10 can be moved by the drive shaft 3. For example, the holding element 20 can be detachably attached to the drive shaft 3 by means of a screw 4 (see FIGS. 2 through 4).

Of course, other detachable fastening types for attaching the holding element 20 to the drive shaft 3 are also conceivable. The advantage of a detachable attachment of the holding element 20 or of the cleaning unit 10 to the drive shaft 3 is obvious: A worn cleaning unit 10 can thus be replaced quickly and easily, without having to replace further components of the sensor 1.

Figure 4:
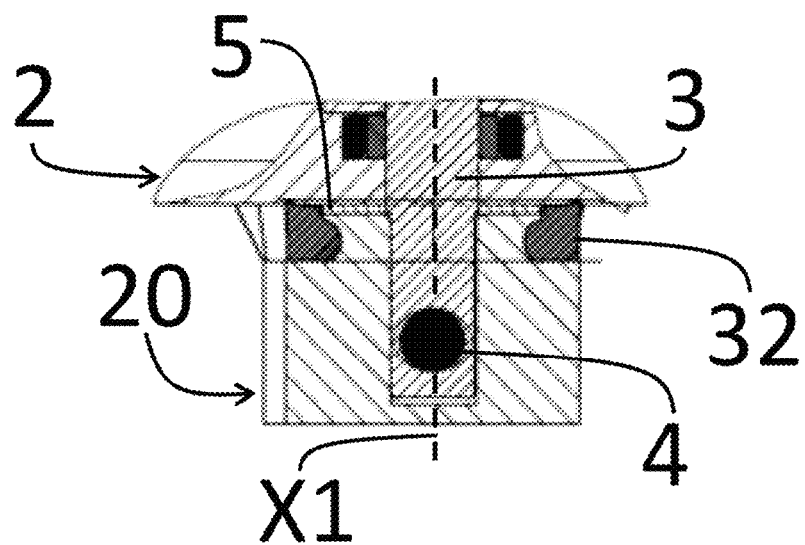
FIG. 4 shows an enlarged sectional drawing of the cleaning unit shown in FIG. 3.

According to one embodiment, a sliding element 5 is arranged between the cleaning unit 10 and the sensor housing 2 (see FIGS. 2 and 4). The sliding element 5 surrounds the drive shaft 3. The sliding element 5 is, for example, a washer or another element which, during the movement of the cleaning unit 10, reduces the effort expended for the movement. The sliding element 5 provides the cleaning unit 10 with an optimal fit on the drive shaft 3. The support surface of the cleaning unit 10 on the surface of the sensor housing 2, represented by a plane E1 in FIG. 2, is also enlarged by the sliding element 5, without increasing the effort expended to rotate the cleaning unit 10. The support surface thus stabilizes and supports the cleaning unit 10 in an optimal manner. Thus, for example, a supporting effect of the cleaning unit 10 on the sensor housing 2 is achieved when forces occur radial to the axis X1 on the cleaning unit 10.

The wiper element 30 is attached to the holding element 20—for example, by a form fit. For example, the holding element 20 has recesses or a groove in order to receive the wiper element 30 (see, for example, FIG. 2 and FIG. 4). The wiper element 30 is preferably made of rubber. The holding element 20 is preferably made of metal or plastic. The wiper element 30 and the holding element 20 may also be produced by means of a multicomponent, injection-molding process, so that, for example, the holding element 20 is injection molded from plastic, and the wiping element 30 is injection molded from rubber.

The wiper element 30 has a ring 31 which axially surrounds the holding element 20 so that the ring 31 is in contact with the sensor housing 2 of the sensor 1 when the holding element 20 is mounted on the drive shaft 3 (see, for example, FIG. 4). The ring 31 without holding element 20 is particularly clearly visible in FIG. 5. In addition to the ring 31, the wiping element 30 preferably has a lip 34.

The ring 31 has at least one tooth 32. The tooth 32 extends radially to the axis X1. The ring 31 has, for example, eight teeth 32, as shown in FIGS. 5 through 8. Any number of teeth 32 can be selected. The number of teeth 32 is preferably a function of a rotational angle of the cleaning unit 10, which will be explained below.

Figure 7:
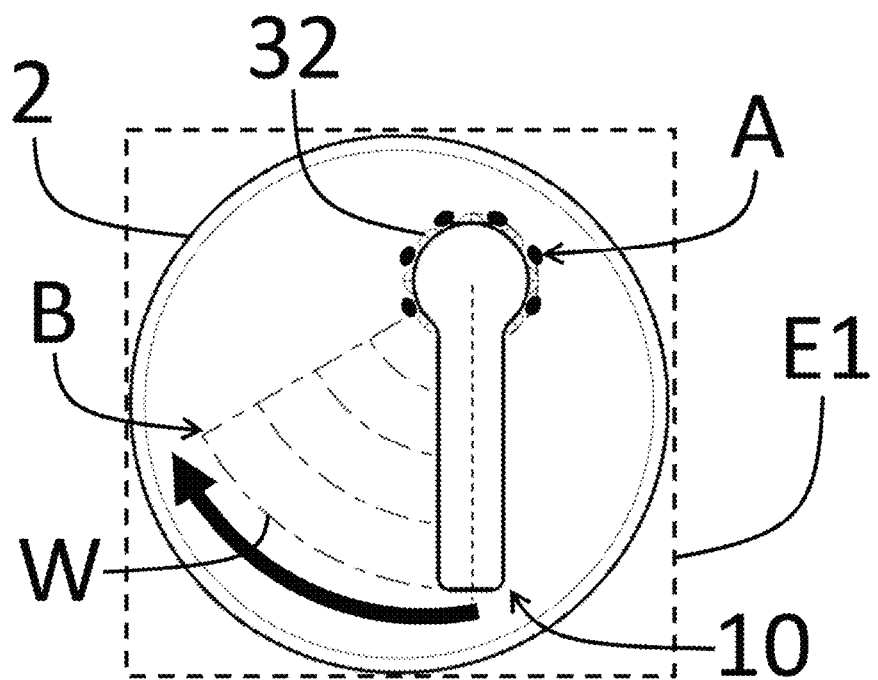
FIG. 7 shows a view of the sensor housing region to be cleaned by the cleaning unit, with the cleaning unit in a first position.
Figure 8:
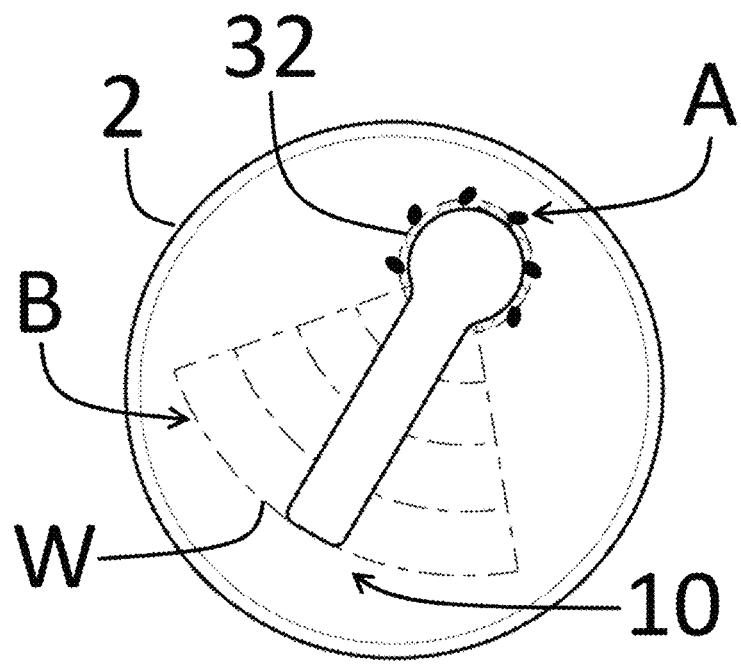
FIG. 8 shows the region shown in FIG. 7 with the cleaning unit in a different position from the first position.

FIG. 7 and FIG. 8 illustrate that the cleaning unit 10, in particular the lip 34, is suitable for cleaning a predetermined region B of the sensor housing 2, e.g., a region of the sensor housing 2 in which a window (not shown) is arranged when the cleaning unit 10 is moved by the drive shaft 3 about the axis X1 at an angle W. FIG. 7 shows the cleaning unit 10 in a first starting position. The arrow in FIG. 7 represents the direction of movement of the cleaning unit 10. FIG. 7 also shows that deposits A have accumulated in a region that is not swept by the lip 34. If these deposits are not removed, they can solidify with time, which can lead to increased effort being expended when the cleaning unit 10 is moved.

FIG. 8 shows the cleaning unit 10 in a different position from that in FIG. 7. It is illustrated here that the deposits A are displaced due to the movement of the teeth 32, however, when the cleaning unit 10 is moved over the region B.

The number of teeth 32 is preferably selected such that the deposits A are moved when the cleaning unit 10 is rotated by the angle W.

In other words, the number of teeth 32 is selected and the teeth 32 are arranged on the ring 31 such that, when the cleaning unit 10 is rotated by the angle W, the teeth 32 pass through a full angle. This ensures that no deposits A accumulate between the teeth 32; instead, the deposits A are moved or removed by the teeth 32.

This means that, when the cleaning unit 10 is rotated by, for example, an angle W of 90°, four teeth 32 spaced evenly from one another are arranged on the ring 31 in order to jointly pass through a full angle. In this case, each tooth is rotated by 90°, as a result of which the full angle of 360° is achieved by means of the uniform spacing of the teeth.

The lip 34 extends radially to the axis X1. The lip 34 is designed to be in contact with the sensor housing 2 when the holding element 20 is mounted on the drive shaft 3.

Figure 5:
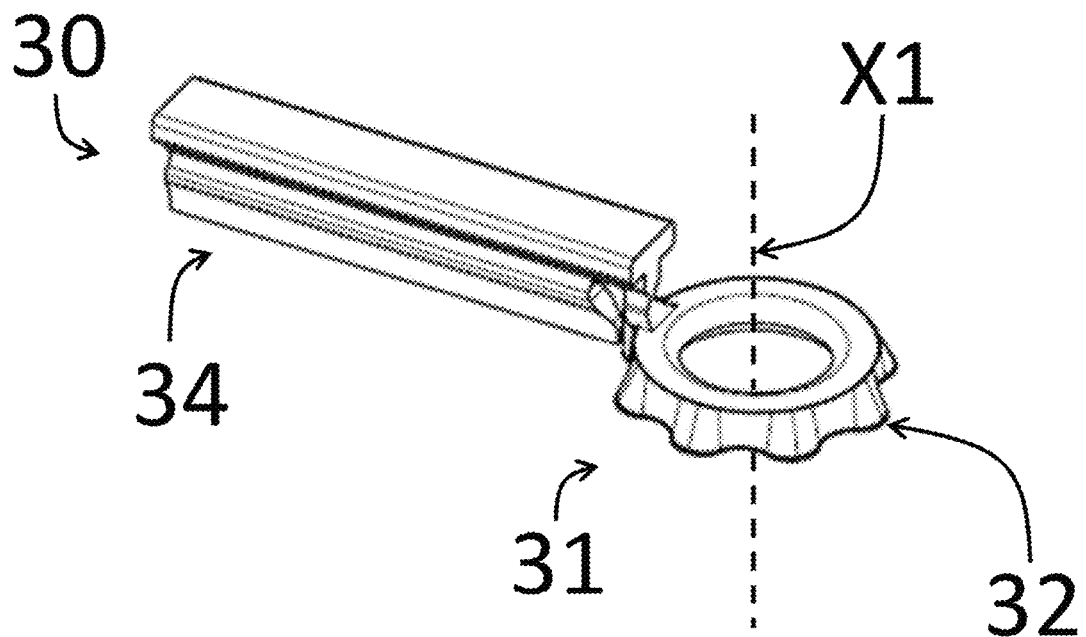
FIG. 5 shows a wiper element of the cleaning unit shown in FIG. 1.
Figure 6:
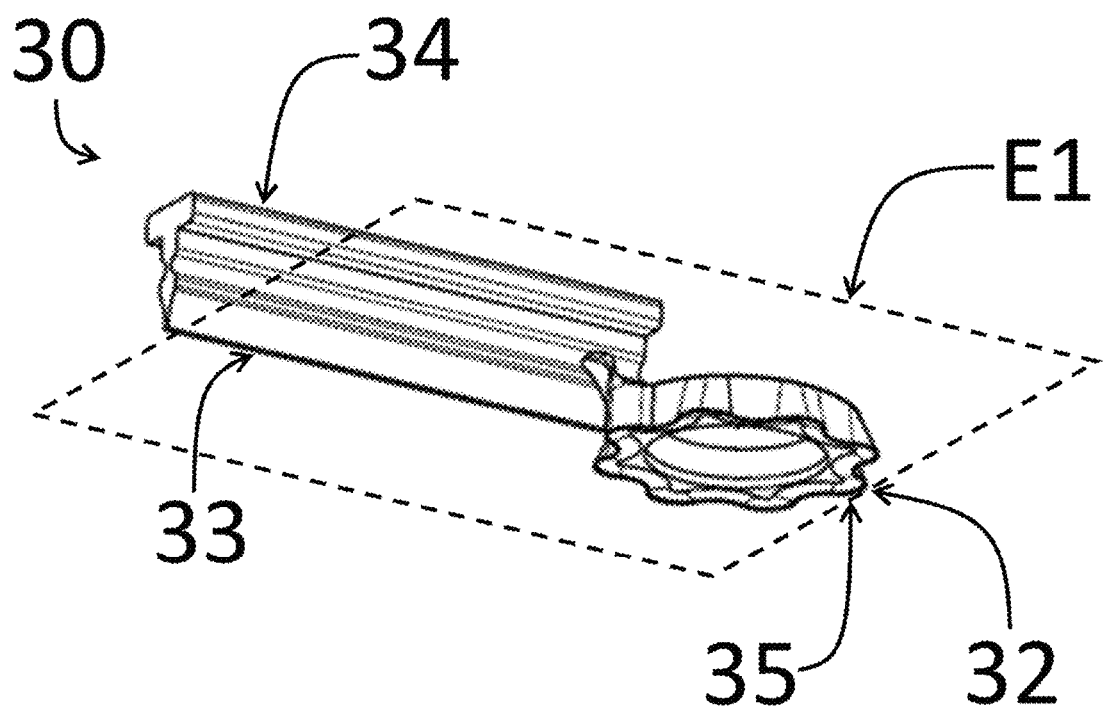
FIG. 6 shows the wiper element shown in FIG. 5 from a different perspective.

As can be seen in FIG. 5 and FIG. 6, the lip 34 and the ring 31 are preferably configured in one piece. This makes it possible for these elements to be replaced in one work step when the lip 34 and the ring 31 are replaced. In addition, it is thus ensured that, when the lip 34 is released from the holding element 20, the lip 34 does not fall into the measuring medium under any circumstances, since the ring 31 holds the lip 34.

As can be seen in FIG. 6, the tooth 32 has a cleaning surface 33. The cleaning surface of the tooth 33 is suitable for coming into contact with the sensor housing 2. The lip 34 also has a cleaning surface 35. The cleaning surface of the lip 35 is also suitable for coming into contact with the sensor housing 2. The two cleaning surfaces 33, 35 are preferably arranged in the plane E1. Homogeneous cleaning of the sensor housing 2 is thus achieved.

What is claimed is:

1. A cleaning unit for a sensor having a sensor housing and a drive shaft, the cleaning unit comprising:
    a holding element which extends along an axis and is suitable for being mounted on the drive shaft so that the cleaning unit can be moved by the drive shaft; and
    a wiper element which is fastened to the holding element and has a ring which axially surrounds the holding element so that the ring is in contact with the sensor housing of the sensor when the holding element is mounted on the drive shaft,
    wherein the ring has at least one tooth which extends radially to the axis.

2. The cleaning unit according to claim 1, wherein the wiper element also has a lip which extends radially to the axis and is designed to be in contact with the sensor housing when the holding element is mounted on the drive shaft.

3. The cleaning unit according to claim 2, wherein the ring and the lip are formed in one piece.

4. The cleaning unit according to claim 1, wherein the wiper element is made of rubber.

5. The cleaning unit according to claim 1, wherein the holding element and the wiper element are produced by means of a multicomponent, injection-molding process.

6. The cleaning unit according to claim 2, wherein the lip is suitable for cleaning a predetermined region of the sensor housing when the cleaning unit is moved by the drive shaft at an angle about the axis, and
   wherein the number of teeth is selected such that the teeth are arranged on the ring such that when the cleaning unit is rotated about the angle, the teeth pass through a full angle so that deposits between the teeth can be avoided.

7. The cleaning unit according to claim 2, wherein the at least one tooth has a cleaning surface and the lip has a cleaning surface, wherein the two cleaning surfaces are arranged in a plane.

8. The cleaning unit according to claim 1, wherein the holding element is detachably attached to the drive shaft.

9. A sensor, comprising:
   a sensor housing;
   a drive shaft; and
   a cleaning unit attached to the drive shaft, the cleaning unit including:
      a holding element which extends along an axis and is suitable for being mounted on the drive shaft so that the cleaning unit can be moved by the drive shaft; and
      a wiper element which is fastened to the holding element and has a ring which axially surrounds the holding element so that the ring is in contact with the sensor housing of the sensor when the holding element is mounted on the drive shaft,
   wherein the ring has at least one tooth which extends radially to the axis.

10. The sensor according to claim 9, further comprising:
   a sliding element arranged on the drive shaft between the cleaning unit and the sensor housing.

* * * * *